Aug. 25, 1964     D. STEPHENSON ETAL     3,146,169
PHARMACEUTICAL FORMULATIONS AND THEIR MANUFACTURE
Filed June 8, 1962     2 Sheets-Sheet 1
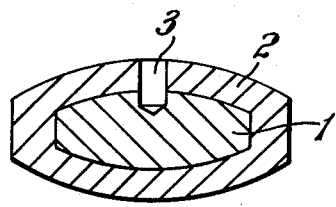
Fig. I
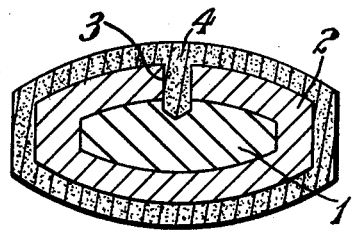
Fig. IV
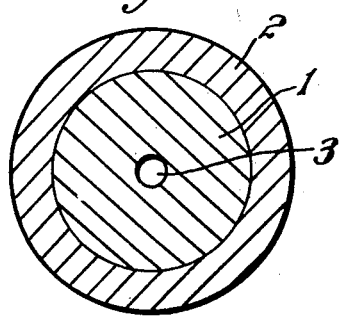
Fig. II
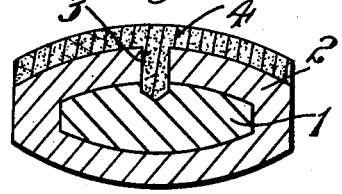
Fig. V
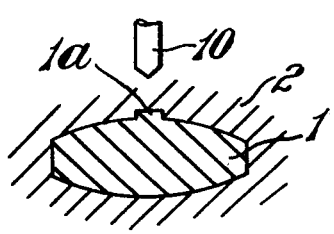
Fig. VI
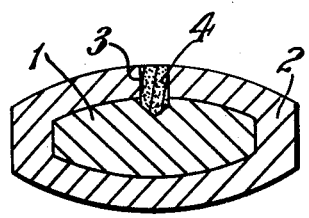
Fig. III
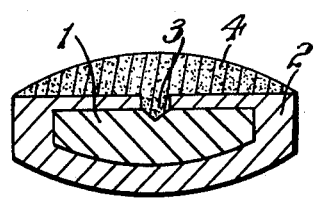
Fig. VII
INVENTORS
Douglas Stephenson
and John Spence Aug. 25, 1964   D. STEPHENSON ETAL   3,146,169
PHARMACEUTICAL FORMULATIONS AND THEIR MANUFACTURE
Filed June 8, 1962                                   2 Sheets-Sheet 2
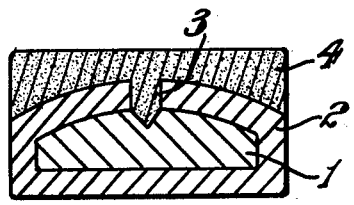
*Fig. VIII*
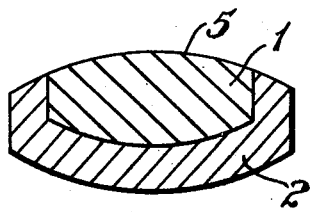
*Fig. IX*
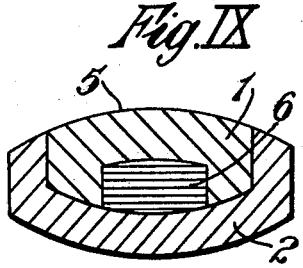
*Fig. X*
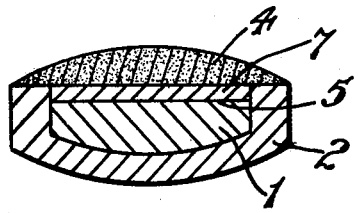
*Fig. XI*
INVENTORS
Douglas Stephenson
and John Spence 3,146,169
PHARMACEUTICAL FORMULATIONS AND
THEIR MANUFACTURE
Douglas Stephenson and John Spence, London, England, assignors to Burroughs Wellcome & Co. (U.S.A.) Inc., Tuckahoe, N.Y., a corporation of New York
Filed June 8, 1962, Ser. No. 201,131
Claims priority, application Great Britain Jan. 21, 1960
6 Claims. (Cl. 167—82)

The present invention relates to tablets containing medicaments and to the manufacture thereof.

This application is a continuation-in-part of our application Serial No. 83,682, filed January 19, 1961, and now abandoned.

In recent years various proposals have been made for formulating tablets containing medicaments for human use so that the medicament is slowly released as the tablet passes through the gastro-intestinal tract of the patient, with the object of providing continuous administration of the medicament over a considerable period.

It is an object of the present invention to provide a novel tablet for this purpose.

According to the present invention in one aspect, there is provided a tablet comprising a medicated portion and a non-medicated inert portion (as hereinafter defined) which covers part but not all of the surface of the medicated portion. That is, there is provided a prolonged acting medicinal preparation comprising a medicated portion and a non-medicated inert portion which reduces the surface area of the medicated portion exposed to the fluids of the gastro-intestinal tract. Thus, the inert portion is around or surrounds part but not all of the medicated portion; and again, it may be applied or compressed around or onto the medicated portion.

It is an essential feature of the invention that the inert portion shall be made of material which is substantially insoluble, indigestible and unabsorbable in fluids of the gastro-intestinal tract of man, and substantially impermeable to the medicament.

Because of its nature, the material of the inert portion is substantially insoluble in water. Preferably the material is such that it maintains its shape for a considerable period, and then softens so that it is easily voided. Thus, in general the material maintains its shape for at least six hours, and may be for as long as 24 hours or even longer, depending on the desired period of administration of the medicament in the medicated portion.

Suitable substances from which material of the inert portion may be made are sublimed sulphur, alone or in admixture with a plastic; bone phosphate or barium sulphate, each alone or in admixture with a wax; and calcium or aluminum silicate, each alone or in admixture with a plastic or wax or both; or mixtures of the above mentioned substances.

In order to make it possible to fashion the substances into a coherent portion of the tablet it may be desirable or necessary to incorporate minor amounts (usually not exceeding 10% by weight of the inert material) of additional substances to act as granulating, binding and lubricating agents, but it will be clear that such additional substances must not be incorporated in such quantities nor be of such nature as to destroy the essential requirements defined above for the inert portion of the tablet.

The preferred amounts of the substances from which the material of the inert portion may be made are, therefore, very variable. The named inorganic substances are preferably present from 20% to 99% by weight, and the plastic and wax respectively from 0% to 10% and from 15% to 80% by weight. The plastic and wax bind the inorganic substances to form the inert portion.

The function of the inert portion is to expose to the action of the fluids of the gastro-intestinal tract only a part of the surface of the medicated portion. As the rate of release of medicament is proportional to the surface area exposed to the fluids, the rate will be slower compared with a conventional tablet. Also, the rate will be constant.

When the medicated portion of the tablet is readily soluble the inert portion surrounds the medicated portion except for a hole through which the contents of the medicated portion gradually pass. The correct size of the hole to achieve any desired rate of release of the medicament will depend on a number of factors, such as the ease of solubility of the medicated portion of the tablet and the thickness of the inert portion, but it may readily be ascertained for any given circumstances by means of a few simple experiments as described in more detail hereinafter. More than one hole may be provided if desired. For less soluble medicaments the size of the hole may be increased until, in effect, a substantial part of the surface of the medicated portion is exposed. However, it is found that the invention is most effective when not more than 50% of the surface area of the medicated portion is exposed.

The medicament in the medicated portion may be any desired medicament. Examples are barbiturates such as phenobarbitone (5-ethyl-5-phenylbarbituric acid), ergotamine, dihydroergotamine, ephedrine (1-phenyl-2-methylaminopropanol), isoephedrine (pseudoephedrine), triprolidine (1,2' - pyridyl-3-pyrrolidone-1-p-tolylprop-1-ene), cyclizine (N-benzhydryl-N'-methylpiperazine), chlorocyclizine (N-4-chlorobenzhydryl-N'-methylpiperazine) and aspirin (acetylsalicylic acid).

According to the present invention in another aspect, there is provided a method for the manufacture of the tablet which comprises the use of the compression coating technique.

Thus, a tablet consisting of a medicated portion and an inert portion which is around the medicated portion and is provided with a hole, may be made by feeding the space between the upper and lower punch faces of a compression coating machine successive batches of material; first, granules of inert material; second, a pre-formed core of the medicated material; and third, more granules of the inert material. The upper punch face is provided with a protrusion, so that when the punch faces are brought together the inert material is compressed around the inner medicated core in the form of a layer provided with a hole made by the protrusion on the upper punch face.

If all of one side of the medicated portion is to be exposed, the protrusion on the upper punch face is not necessary but the second batch of inert material is omitted.

A preferred method for the manufacture of a tablet having an inert portion which is around a medicated portion and is provided with a hole, comprises using a preformed medicated portion which has a raised region in the vicinity where the hole will be formed in the inert portion. Such a medicated portion may be made by feeding granules into the space between the upper and lower punch faces of a compression machine. The upper punch face is provided with a depression, so that when the punch faces are brought together the granules are compressed in the form of a medicated unit provided with a raised region made by the depression in the upper punch face. When such a medicated portion is coated in a compression coating machine with an inert portion having a hole, the raised region engages with the protrusion on the upper punch face of the coating machine and ensures that the inert portion does not completely cover the medicated portion. This is the particularly preferred method when the hole in the inert portion is relatively large.

Various embodiments of the invention are shown in the accompanying drawings, FIGURES I, III, IV, V, VI, VII, VIII, IX, X and XI being vertical sections and FIGURE II a horizontal section. It will be understood that the embodiments shown in the figures are only illustrative, are not necessarily to scale, and are not limiting on the scope of the invention.

In FIGURES I and II there is shown a tablet consisting of a medicated portion 1, an inert portion 2 which around the medicated portion 1 and is provided with a hole 3, which extends into the medicated portion 1 and through which the medicament in the portion 1 is slowly released into the gastro-intestinal tract when the tablet is swallowed.

In FIGURE III there is shown a pre-formed medicated portion 1 surrounded by granules of an inert portion 2. The medicated portion 1 has a raised region 1a in the vicinity where a hole will be formed in the inert portion 2 by a protrusion 10 on the upper punch face in a compression coating machine.

In FIGURES IV, V and VI, there are shown similar tablets which contain a further outer layer 4. This further outer layer may be a conventional sugar coating for protecting the rest of the tablet from damage such as the effects of moisture, for making the whole tablet of conventional appearance, and for preventing air bubbles being caught in the hole 3, or it may be a medicated layer which will also give a quick release of an initial dose of the same medicament which is in the medicated portion 1 or of a different medicament.

In FIGURES VII and VIII, there are shown similar tablets in which both the medicated portion 1 and the inert portion 2 have one side flat. This makes the compression coating operations easier because the units are more easily controlled on a compression coating machine.

In FIGURE IX there is shown a tablet consisting of a medicated portion 1 which has a substantial part of its surface 5 exposed while the remainder of the portion 1 is covered by an inert portion 2.

In FIGURE X there is shown a tablet built up on an inner core 6. This inner core may consist of non-medicated material such as starch or lactose alone or of medicated material which may contain the same medicament which is in a medicated portion 1 or a different medicament.

In FIGURE XI there is shown tablet consisting of a medicated portion 1, an inert portion 2, a further outer layer 4 and an internal layer 7. This layer 7 may be a conventional enteric coating which will not expose the medicated portion 1 until the tablet has passed through the stomach. On removal of the internal layer 7 the medicament in the medicated portion 1 will be gradually released from the surface 5.

The invention will now be described with reference to the following examples, in which all temperatures are given in degrees centigrade, and the symbol # designates the standard size of the mesh of the sieve used, as defined in the British Pharmacopoeia, 1958, page 968.

EXAMPLE 1

The following materials for a medicated portion 1 were granulated:

| | G. |
|---|---|
| Ephedrine hydrochloride (85#) | 500 |
| Lactose (85#) | 500 |
| Magnesium stearate (85#) | 10 |

The ephedrine hydrochloride and lactose were mixed and granulated with a 10% gelatin solution (240 ml.). The mass was sifted 30# and dried at 50°. The dried granules were sifted 30#, and the magnesium stearate added.

The following materials for an inert portion 2 were granulated:

| | G. |
|---|---|
| Sublimed sulphur (85#) | 1000 |
| Polyvinyl acetate | 65 |
| Magnesium stearate (85#) | 10 |

The polyvinyl acetate was dissolved in acetone (650 ml.), and the solution used to granulate the sulphur. The mass was sifted 30# and dried at 50°. The dried granules were sifted 30#, and the magnesium stearate added.

The following materials for a further outer layer 4 were granulated:

| | G. |
|---|---|
| Ephedrine hydrochloride (85#) | 150 |
| Lactose (85#) | 850 |
| Potato starch (85#) | 112.5 |
| Magnesium stearate (85#) | 13.5 |

The ephedrine hydrochloride and lactose and half the starch were mixed and granulated with a 5% gelatin solution (260 ml.). The mass was sifted 30# and dried at 50°. The dried granules were sifted 30#, and the magnesium stearate and the rest of the starch added.

The medicated granules for the portion 1 were compressed in one unit of a compression coating machine; each portion had a weight of 124 mgms. and a diameter of 7.4 mm. The granules for the inert portion 2 were compressed onto each portion 1 in a second unit of the machine, a hole 3 being formed through the portion 2 into the portion 1 by a pointed protrusion on each face of the upper punches in the unit; the products so formed each had a weight of 350 mgms. and a diameter of 10.2 mm., the hole 3 having a diameter of 3.1 mm. The further outer layer 4 granules were compressed completely around each product in a third unit of the machine. The final tablets each had a weight of 500 mgms. and a diameter of 11.8 mm., and contained ephedrine hydrochloride (20 mgms.) in the further outer layer 4 for immediate release and ephedrine hydrochloride (60 mgms.) in the medicated portion 1 for prolonged release.

EXAMPLE 2

The following tablets were prepared in a manner analogous to that described in Example 1. The composition of each of the medicated portions 1 and the inert portions 2 was the same as that in Example 1, but none of these tablets had a further outer layer 4. The medicated portions 1 had a weight of 124 mgms. and a diameter of 7.4 mm.; the tablets had a weight of 350 mgms. and a diameter of 10.2 mm.; and the holes 3 had a diameter of (a) 1.8 mm.;
(b) 2.71 mm.;
(c) 3.16 mm.;
(d) 3.3 mm.; or
(e) 4.3 mm.

In Table I is given the release over a period of the ephedrine hydrochloride from each of these tablets in successively three different solutions at 37°. The volumes of the solutions were adjusted to give between 400 mls. and 500 mls. in any hour. The period for which tablets were in each solution and the nature of each solution simulated the conditions in which the tablets would be as they pass through the gastro-intestinal tract of a patient. The acid solution was hydrochloric acid (N/20), the neutral sodium chloride (0.9%) and the alkaline sodium bicarbonate (1.5%). In each instance, four tablets of each type were used, and the average release was taken. The time is given in hours.

Table I

| Time | Solution | Cumulative percentage released ||||| 
|---|---|---|---|---|---|---|
| | | a | b | c | d | e |
| ½ | Acid | 2.0 | | | 5.8 | 7.6 |
| 1 | do | | 7.6 | 17.7 | | |
| 1½ | do | 4.4 | | | 20.7 | 36.0 |
| 2 | do | | 17.0 | 35.9 | | |
| 2½ | do | 7.1 | | | 35.0 | 66.2 |
| 3 | Neutral | | 23.6 | 42.8 | | |
| 3½ | do | 11.1 | | | 43.3 | 82.7 |
| 4 | do | | 31.2 | 51.0 | | |
| 4½ | do | | | | 50.9 | 87.5 |
| 4¾ | do | 13.2 | | | | |
| 5 | do | | 37.1 | 57.7 | | |
| 5½ | do | 15.1 | | | 63.1 | |
| 5½ | Alkaline | | | | | 100.0 |
| 6 | do | | 45.3 | 64.4 | | |
| 6½ | do | 19.8 | | | 74.8 | |
| 7 | do | | 56.1 | 71.5 | | |
| 7½ | do | 25.8 | | | 99.9 | |
| 8 | do | | 78.3 | 99.9 | | |

EXAMPLE 3

The following materials for a medicated portion 1 were granulated:

| | G. |
|---|---|
| Dihydroergotamine tartrate (85#) | 6.0 |
| Sucrose (85#) | 93.0 |
| Magnesium stearate (85#) | 1.0 |

The dihydroergotamine tartrate and sucrose were mixed and granulated with a 10% gelatin solution (20 ml.). The mass was sifted 30# and dried at 37°. The dried granules were sifted 30#, and the magnesium stearate added.

The following materials for an inert portion 2 were granulated:

| | G. |
|---|---|
| Bone phosphate (85#) | 4000 |
| Colophony resin | 90 |
| Beeswax | 90 |
| Magnesium stearate (85#) | 5 |

The resin and beeswax were melted in a steam-heated mixer, the bone phosphate added and the whole mixed until homogeneous. The mass was cooled, broken up and sifted 30#, and the magnesium stearate added.

The following materials for a further outer layer 4 were granulated:

| | G. |
|---|---|
| Dihydroergotamine tartrate (85#) | 1.0 |
| Lactose (85#) | 100.0 |
| Potato starch (85#) | 13.0 |
| Magnesium stearate (85#) | 1.0 |

The dihydroergotamine tartrate and lactose and half the starch were mixed and granulated with a 5% gelatin solution (33 ml.). The mass was sifted 30# and dried at 37°. The dried granules were sifted 30#, and the magnesium stearate and the rest of the starch added.

The granules for the medicated portion 1 were compressed in one unit of a compression coating machine; each portion had a weight of 100 mgms. and a diameter of 7.4 mm. The granules for the inert portion 2 were compressed onto each portion 1 in a second unit of the machine, a hole 3 being formed through the portion 2 into the portion 1 by a pointed protrusion on each face of the upper punches in the unit; the products each had a weight of 385 mgms. and a diameter of 10.2 mm., the hole 3 having a diameter of 4.3 mm. The further outer layer 4 granules were compressed completely around each product in a third unit of the machine. The final tablets each had a weight of 500 mgms. and a diameter of 11.8 mm. and contained dihydroergotamine tartrate (1 mgm.) in the further outer layer 4 for immediate release and dihydroergotamine tartrate (6 mgms.) in the medicated portion 1 for prolonged release.

EXAMPLE 4

The following tablet was prepared in a manner analogous to that described in Example 3. The composition of the medicated portion 1 and the inert portion 2 was the same as that in Example 3, but the tablet had no further outer layer 4. The medicated portion 1 had a weight of 100 mgms. and a diameter of 7.4 mm.; the tablet had a weight of 275 grams. and a diameter of 10.2 mm.; and the hole had a diameter of 4.3 mm.

In Table II is given the release over a period of the dihydroergotamine tartrate from this tablet. The details were exactly the same as those for the release of ephedrine hydrochloride given in Table I.

Table II

| Time | Solution | Cumulative percentage released |
|---|---|---|
| ½ | Acid | 3.6 |
| 1½ | do | 20.0 |
| 2½ | do | 32.1 |
| 3½ | Neutral | 40.2 |
| 4¾ | do | 52.4 |
| 5½ | do | 58.4 |
| 6½ | alkaline | 64.8 |
| 7½ | do | 74.4 |

EXAMPLE 5

The following materials for a medicated portion 1 were granulated:

| | G. |
|---|---|
| Pseudoephedrine hydrochloride (85#) | 1000 |
| Triprolidine hydrochloride (85#) | 41.6 |
| Magnesium stearate (85#) | 10.0 |

The two medicaments were mixed and granulated with a 10% gelatin solution (15 ml.). The granules were sifted 30# and dried at 50°. The dried granules were sifted 30#, and the magnesium stearate added.

The following materials for an inert portion 2 were granulated:

| | G. |
|---|---|
| Calcium silicate (85#) | 1220 |
| Hydrogenated castor oil | 3000 |
| Magnesium stearate (85#) | 50 |

The hydrogenated castor oil was melted in a steam-heated mixer, the silicate added and the whole mixed until homogeneous. The mass was cooled, broken up and sifted 30#, and the magnesium stearate added.

The following materials for a further outer layer 4 were granulated:

| | G. |
|---|---|
| Pseudoephedrine hydrochloride (85#) | 300 |
| Triprolidine hydrochloride (85#) | 12.5 |
| Lactose (85#) | 627.5 |
| Potato starch (85#) | 112.5 |
| Magnesium stearate (85#) | 10.0 |

The two medicaments, lactose and part of the starch (50 g.) were mixed. The powder was granulated with a starch mucilage formed from another part of the starch (12.5 g. in 150 ml. of water). The mass was sifted 30# and dried at 50°. The dried granules were sifted 30#, and the magnesium stearate and the rest of the starch added.

The granules for the medicated portion 1 were compressed in one unit of a compression coating machine; each portion 1 had a weight of 189 mgms. and a diameter of 8.2 mm. The granules for the inert portion 2 were compressed onto each portion 1 in a second unit of the machine, a hole 3 being formed through the portion 2 into the portion 1 by a pointed protrusion on each face of the upper punches in the unit; the products each had a weight of 410 mgms. and a diameter of 10.2 mm., the hole 3 having a diameter of 1.8 mm. The further outer layer 4 granules were compressed completely around each product in a third unit of the machine. The final tablets each had a weight of 610 mgms. and a diameter of 12.6 mm.

EXAMPLE 6

Similar tablets to those described in Examples 1 to 5 inclusive were made using a medicated portion 1 which had a raised region 1a in the vicinity where the hole 3 was to be formed in the inert portion. The medicated granules for the portion 1 were compressed in one unit of a compression coating machine, each of the upper punch faces in the unit being provided with a depression.

EXAMPLE 7

Similar tablets to those described in Examples 1 to 6 inclusive were made using granules of the following materials for the inert portions 2:

(a)

| | G. |
|---|---|
| Bone phosphate | 94 |
| Polyvinyl acetate | 6 |

The polyvinyl acetate was dissolved in chloroform, and the solution used to granulate the bone phosphate, which was commercially available under the name "Calfos."

(b)

| | G. |
|---|---|
| Aluminum silicate | 64 |
| Paraffin wax | 35 |
| Magnesium stearate | 1 |

The wax was melted, and the aluminum silicate in the form of "Heavy Kaolin" added. The mass was cooled and broken up, and the magnesium stearate added.

(c)

| | G. |
|---|---|
| Sublimed sulphur | 99 |
| Magnesium stearate | 1 |

The sublimed sulphur was granulated with a 10% solution of polyvinyl acetate in acetone. The mixture was dried, and the magnesium stearate added.

(d)

| | G. |
|---|---|
| Bone phosphate | 69 |
| Colophony resin | 15 |
| Beeswax | 15 |
| Magnesium stearate | 1 |

The resin and beeswax were melted, the bone phosphate (which was commercially available under the name "Calfos") added, and the mass cooled and broken up. The magnesium stearate was added.

(e)

| | G. |
|---|---|
| Calcium silicate | 30 |
| Hydrogenated castor oil | 69 |
| Magnesium stearate | 1 |

The hydrogenated castor oil was melted, and the calcium silicate added. The mass was cooled and broken up, and the magnesium stearate added.

EXAMPLE 8

The following materials for an inner core 6 were granulated:

| | G. |
|---|---|
| Cyclizine hydrochloride (85#) | 250 |
| Polyethylene glycol 4000 | 250 |
| Magnesium stearate (85#) | 5 |

The polyethylene glycol 4000 was melted in a steam-heated mixer, and the cyclizine hydrochloride added. The mass was allowed to cool and sifted 30#. The magnesium stearate was added.

The following materials for a medicated portion 1 were granulated:

| | G. |
|---|---|
| Cyclizine hydrochloride (85#) | 750 |
| Casein (85#) | 975 |
| Hydrogenated castor oil | 150 |
| Magnesium stearate (85#) | 170 |

The hydrogenated castor oil was melted in a steam-heated mixer and some of the magnesium stearate (150 g.) added. The cyclizine hydrochloride and the casein were mixed and added to the hydrogenated castor oil/magnesium stearate mixture. The resulting mixture was granulated with a 10% gelatin solution (100 mls.). The mass was sifted 30# and dried at 50°. The dried granules were sifted 30#, and the magnesium stearate added.

The following materials for an inert portion 2 were granulated:

| | G. |
|---|---|
| Calcium silicate (85#) | 724 |
| Hydrogenated castor oil | 1776 |
| Magnesium stearate (85#) | 25 |

The hydrogenated castor oil was melted in a steam-heated mixer and the calcium silicate added. The mass was cooled, broken up and sifted 30#. The magnesium stearate was added.

A compression coating machine equipped to compress two coatings onto a core was used. The granules for the inner core 6 were compressed on the core side of the machine; each core had a weight of 50.5 mgms. and a diameter of 5.6 mm. The medicated granules for the portion 1 were compressed onto the upper side of each core 6 in the first coating unit of the machine. The products so formed each had a weight of 255 mgms. and a diameter of 8.2 mm. The granules for the inert portion 2 were compressed onto the lower side of each of these products. The final tablets each had a weight of 505 mgms. and a diameter of 11.0 mm., and contained cyclizine hydrochloride (25 mgms.) in the inner core 6 between the medicated portion 1 and the inert portion 2, and cyclizine hydrochloride (75 mgms.) in the medicated portion 2 which was exposed on one side 5.

EXAMPLE 9

(a) The following materials for a medicated portion 1 were granulated:

| | G. |
|---|---|
| Aspirin (20#) | 100 |
| Potato starch | 2.5 |

The aspirin and potato starch were mixed.

The granules prepared in Example 7e were used for an inert portion 2.

The following materials for a further outer layer 4 were granulated:

| | G. |
|---|---|
| Paracetamol (p-hydroxyacetanilide) | 100 |
| Potato starch | 10 |
| Talc | 2 |

The paracetamol and half the starch were mixed and granulated with a 5% gelatin mucilage. The mass was sifted 20# and dried. The talc and the rest of the starch were added.

The following materials for an internal layer 7 were granulated:

| | G. |
|---|---|
| Cellulose acetate phthalate (80#) | 25 |
| Lactose | 25 |
| Triethanolamine | 10 |

The phthalate and lactose were mixed and granulated with the triethanolamine in water (2.5 mls.). The mass was dried in a vacuum oven, broken up and sifted 30#.

A compression coating machine was used. The medicated granules for the portion 1 were compressed; each portion had a weight of 200 mgms. The granules for the internal layer 7 were compressed onto the upper side of each portion 1; the products so formed each had a weight of 250 mgms. The granules for the inert portion 2 were compressed onto the lower side of each of these products; the weight was 510 mgms. The further outer layer granules 4 were compressed onto the upper side; the final tablets each had a weight of 850 mgms.

(b) Similar tablets were made and had the following weights:

| | Mgms. |
|---|---|
| Medicated portion 1 | 300 |
| Internal layer 7 | 50 |
| Inert portion 2 | 400 |
| Further outer layer 4 | 410 |

We claim:

1. A prolonged acting medicinal preparation adapted for internal administration comprising a solid inner medicated portion readily dissolvable in the fluids of the gastro-intestinal tract and an outer non-medicated portion which is substantially insoluble, indigestible and unabsorbable in the fluids of the gastro-intestinal tract and which is inert and impermeable to the medicament and substantially surrounds the readily dissolvable inner portion except for an aperture extending through the outer layer to the inner medicated layer, said outer layer being rigid and non-deformable in the body during the period of medication so that the dissolvable inner portion of the tablet is partially exposed to the gastro-intestinal fluids and the medicament in solution is gradually released through said aperture into the gastro-intestinal tract.

2. A prolonged action medicinal preparation as set forth and claimed in claim 1 wherein the material of the inert portion essentially comprises sublimed sulphur together with a suitable insoluble indigestible binding agent.

3. A prolonged acting medicinal preparation as set forth and claimed in claim 1 wherein the material of the inert portion essentially comprises bone phosphate together with a suitable insoluble indigestible binding agent.

4. A prolonged acting medicinal preparation as set forth and claimed in claim 1 wherein the material of the inert portion essentially comprises barium sulphate together with a suitable insoluble indigestible binding agent.

5. A prolonged acting medicinal preparation as set forth and claimed in claim 1 wherein the material of the inert portion essentially comprises calcium silicate together with a suitable insoluble indigestible binding agent.

6. A prolonged acting medicinal preparation as set forth and claimed in claim 1 wherein the material of the inert portion essentially comprises aluminum silicate together with a suitable insoluble indigestible binding agent.

References Cited in the file of this patent

UNITED STATES PATENTS

| 216,107 | Rchards | June 3, 1879 |
|---|---|---|
| 1,525,505 | Kavanagh | Feb. 10, 1925 |
| 2,106,097 | Homan | Jan. 18, 1938 |
| 2,312,381 | Bickenheuser | Mar. 2, 1943 |
| 2,671,451 | Bolger | Mar. 9, 1954 |
| 2,739,065 | Hugin | Mar. 20, 1956 |
| 2,773,502 | Kaslow | Dec. 11, 1956 |
| 2,801,203 | Leb et al. | July 30, 1957 |
| 2,898,913 | Ritter et al. | Aug. 11, 1959 |
| 2,962,023 | Chappaz et al. | Nov. 29, 1960 |
| 2,987,445 | Levesque | June 6, 1961 |
| 3,048,526 | Boswell | Aug. 7, 1962 |
| 3,071,476 | Werft et al. | Jan. 1, 1963 |

FOREIGN PATENTS

| 134,276 | Australia | Sept. 14, 1946 |
|---|---|---|
| 227,098 | Australia | Mar. 2, 1960 |
| 562,124 | Belgium | May 5, 1958 |
| 442,266 | France | Apr. 6, 1912 |
| 9,977 of 1843 | Great Britain | June 8, 1844 |
| 15,161 of 1902 | Great Britain | June 2, 1903 |